United States Patent Office 3,371,991
Patented Mar. 5, 1968

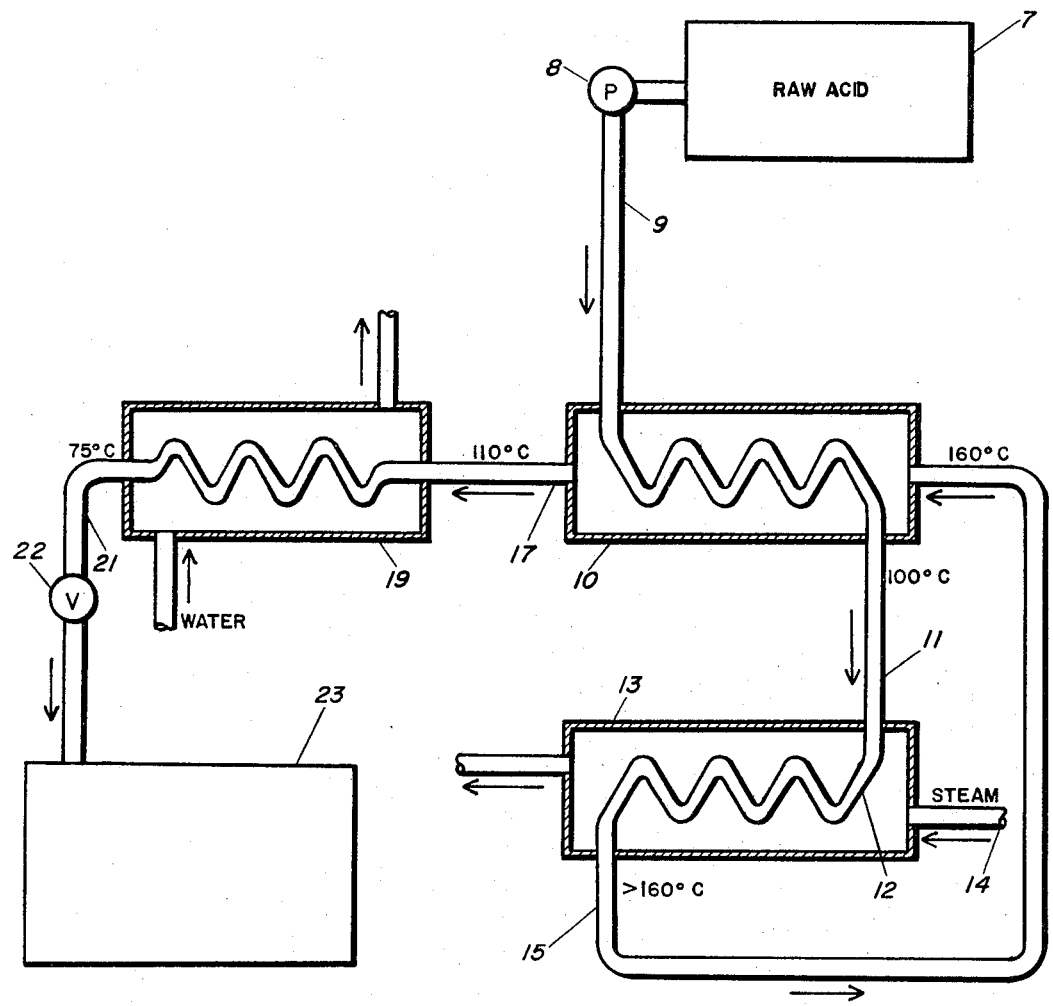

3,371,991
STABILIZATION OF WET PROCESS PHOSPHORIC ACID BY HEATING UNDER PRESSURE AND WITHOUT EVAPORATION
Frank J. Sergeys, Kensington, and Casimer C. Legal, Jr., and Gordon J. Turner, Baltimore, Md., assignors to W. R. Grace & Co., New York, N.Y., a corporation of Connecticut
Filed Jan. 6, 1964, Ser. No. 335,749
5 Claims. (Cl. 23—165)

ABSTRACT OF THE DISCLOSURE

Wet process phosphoric acid is stabilized by heating the acid for a relatively short period of time to above its boiling point under pressure while preventing volatilization. After cooling, the recovered wet process phosphoric acid may be shipped or stored over an extended time period without appreciable post-precipitation or sedimentation.

---

This invention relates to the stabilization of wet process phosphoric acid. More particularly, it relates to a method for inhibiting the formation of solids in phosphoric acid produced according to the so-called "wet process" by acidulating phosphate rock or other phosphatic material with an acid.

In conventional methods for the production of aqueous solutions of inorganic acidic phosphatic materials, particularly phosphoric acid, phosphate rock is reacted with sulfuric acid and the reaction product is filtered and water leached to yield a crude aqueous solution product in which is suspended a substantial quantity of solid impurities. The crude aqueous solution also contains dissolved impurities. This crude aqueous product, after concentration, is the so-called wet process phosphoric acid of commerce.

The problems occasioned by dissolved impurities and suspended solid impurities are particularly acute with respect to wet process phosphoric acid. Conventional practice in the preparation of phosphoric acid yields a crude wet process phosphoric acid containing from about 15% to about 35% by weight of phosphorus pentoxide ($P_2O_5$) and a substantial portion of suspended solid and dissolved impurities which do not readily settle. A portion of said impurities does settle out, but with an unpredictable rate of precipitation so that there is continual settling over a period of time. Such crude dilute wet process acid is normally concentrated to increase the $P_2O_5$ content to at least about 45% by weight and more frequently to at least 52% by weight. The resultant concentrated acid is normally dark in color. The concentration procedure necessarily also serves to proportionately increase the concentration of impurities in the acid and yields concentrated acid solutions containing dissolved impurities and frequently containing about 15% to about 30% by weight of suspended solids, which are particularly difficult to remove from the solution.

In general, it has been determined that the impurities present in wet process acidic phosphatic solutions, such as wet process phosphoric acid, comprise calcium sulfate hemihydrate ($CaSO_4 \cdot \frac{1}{2}H_2O$), calcium sulfate anhydrite ($CaSO_4$), sodium, potassium, iron and aluminum phosphates; and also fluorine and silica compounds and complexes. In acidic solutions resulting from concentration or other procedures, organic materials may also be introduced in small amounts. These constituents may theoretically be represented by the formula $RPO_4 \cdot 2H_3PO_4$, where R is an organic radical derived from the organic material employed in the production of the particular phosphatic solution treated. There may also be varying amounts of other organic and inorganic matter present. These various impurities are desirably substantially removed in order to have an acidic phosphatic solution which is saleable in competition with "furnace phosphoric acid" for the manufacture of fertilizers and animal feed grade products.

Upon standing in storage or during shipment in tank cars or the like, such acidic phosphatic solutions deposit a layer of solid material, an effect which renders handling of the stored or shipped acid exceedingly difficult and frequently economically infeasible. Some solids and color may be removed from the crude solution by filtration. However, the concentrated acid is difficult to filter; further, the solids are of such a nature that they readily plug the filter. Moreover, the solids are very difficult to remove from the filter. Also, even when the acid is filtered, upon further standing solids form in the solution and settle out. The solids which subsequently form in the solution and settle out of the solution are usually designated post-precipitated solids, and the mechanism is termed post-precipitation.

The instant invention of stabilizing wet process phosphatic solutions as contemplated by this invention differs fundamentally from the defluorination of similar phosphatic solutions. The present invention is applicable to stabilize impurities in defluorinated or non-defluorinated aqueous solutions or inorganic phosphates.

It is accordingly an object of this invention to provide a method for efficiently producing a stable acidic phosphatic solution.

It is another object to provide a process for the production of wet process phosphoric acid which demonstrates substantially less post-precipitation of solids than conventional wet process phosphoric acid.

It is a further object of the invention to provide a wet process phosphoric acid that may be shipped or stored over an extended time period without appreciable post-precipitation or sedimentation.

It is an additional object of the invention to provide an economical process for the stabilization of concentrated wet process phosphoric acid, whereby metallic and other ions are not removed from said acid, but suspended indefinitely in said acid, making product more valuable for fertilizer usage.

It is a more specific object of the invention to provide an economical process for the clarification of concentrated wet process phosphoric acid which does not utilize clarifying agents.

It is another specific object of the invention to provide a process for the continuous stabilization of concentrated wet process phosphoric acid which is appropriate for installation in a conventional wet process phosphoric acid plant.

Generally described, it has been discovered that solutions of acidic inorganic phosphatic materials, containing dissolved impurities and suspended solid impurities can efficiently be clarified by raising the temperature of the acid above its normal boiling point by heating under pressure, in a closed vessel so as to suppress any volatilization from the acidic solution; and allowing said acidic solution to remain at these conditions for a period not less than 2 minutes, preferably not less than 5 minutes.

It has been previously suggested to clarify wet process phosphoric acid by using specific clarification agents such as conventional commercial flocculating agents, which are stable in concentrated mineral acids. These clarification agents increase the settling rate of solids suspended in the wet process phosphoric acid. The cost of the clarification process, which involves both the cost of the agent plus the expensive cost of settling tanks and equipment, adds to the cost of the process. Also, the sludge deposits produced create an additional problem of disposal, no small task for the industrial plant. Further, it is often desirable to produce a clarified solution without the use of clarification reagents. In the process of this invention a clarification agent is not necessary.

It has also been suggested that a clarified wet process phosphoric acid may be obtained by centrifuging a crude wet process phosphoric acid that has been held in a quiescent state for a sufficient amount of time to permit precipitation of substantially all of the solids from the supersaturated solution. Using such a process it was believed necessary to maintain the acid in a quiescent state for at least five days before performing the centrifugal separation of the supernatant liquid. Such a prolonged period of holding has the disadvantage of requiring a large holding tank, which on the commercial scale, results in hundreds of thousands of gallons tied up in unprofitable inventory, a most unwelcome plan.

In accordance with this invention, an inorganic acidic phosphatic solution containing impurities is subjected to heating for at least 2 minutes above its boiling point under pressure, while preventing volatilization. The exact reason why our inventive process is effective in producing a clarified acid exhibiting less post-precipitation those conventional wet process phosphoric acid has not been definitely established. One theory is that the heating breaks up the solids into such tiny particles that later agglomeration and objectional post-precipitation is effectively delayed. These acids have been found to be stable for more than 60 days, which is the normal period of storage of these acids.

The process of this invention can be practiced under temperature condition ranging from 100° C.–250° C. although temperatures in the range of 120–160° C. are preferable because these are easily attainable in ordinary plant equipment and produce the desired results quickly and efficiently.

The pressures are autogeneous for the temperatures employed in a closed system. They will be 28–70 p.s.i.g. for the preferred range.

A residence time under these temperature and pressure conditions may be 2 to 60 minutes or more, although a preferable residence time is 6–15 minutes. Obviously, the time will depend on the temperature employed and will be the shortest practical time required to accomplish the desired result.

In order to more fully understand the process of this invention, one appropriate apparatus is illustrated in the drawing. The raw acid which is to be treated by the inventive process is the acidulated phosphate solution which results from acidulating rock and filtering out precipitated $CaSO_4 \cdot 2H_2O$ after filtration or centrifugation has been effected to remove the gross precipitated calcium sulfate. The raw acid may further have been concentrated to a $P_2O_5$ content of above 45% by weight and preferably, but not necessarily about 52% by weight.

In accordance with the present invention, raw acid is pumped under pressure by pump 8, from feed tank 7 through line 9, into a preheater 10, where the temperature of the raw acid is raised to about 100° C. Said acid moves from preheater 10 through outlet line 11, into heater 13. Steam is kept flowing in heat exchange contact with the acid in coil 12. The temperature of the acid is raised to that desired through heater 13. Steam temperature is not critical to our invention since the steam is not in direct contact with said raw acid. However, the steam temperature must be such as to heat the raw acid to the chosen temperature within the pre-determined residence time of the acid in the heater. As noted above, the residence time in heater 13 should be chosen to be 6–15 minutes although residence times of as long as 60 minutes or longer, i.e., 2–5 hours, are not detrimental to our invention, longer residence times, while permissable are considered economically unattractive.

The heat-treated raw acid is then pumped via line 15 and into preheater 10, to preheat incoming raw acid from tank 7. The treated acid is pumped through via line 17 through cooler 19, through which water is passed as a continuous heat sink to reduce the temperature well below the boiling point. The treated acid then passes through outlet 21 and then through back pressure control valve 22 to storage 23 maintained at atmospheric pressure.

It will be evident to one skilled in the art that passing the heated acid into the preheater is a step which is economical but not of vital inventive importance. The raw acid could just as easily be pumped directly into heater 13, and raised from room temperature to the desired temperature; also, the heated acid could be pumped directly from heater 13 into cooler 19. However, it is thought that the preheating step is an elegant and efficient refinement of the process, albeit not a crucial one. The operation of the apparatus as shown in the drawing will be readily understood from the foregoing description thereof, and from the following examples which are illustrative of the best presently known made for the practice of the invention.

*Example I*

A sample of wet process phosphoric acid prepared in the conventional manner containing about 54% by weight $P_2O_5$ having been centrifuged to remove gross precipitants was passed through a coil immersed in heated oil where the acid temperature was raised to about 150° C. A closed system was used to avoid boiling of the acid. The pressure was that which was spontaneously generated by the system. Flow rate and heater temperature were chosen so that the acid was maintained at the indicated pressure and temperature for about 8 minutes. The treated acid flowed from the heater to the cooler where the acid temperature was reduced to about 75° C. which is sufficiently cool so that the acid may be stored without serious corrosion problems. This is also cooled sufficiently to prevent volatilization and concentration by evaporation. After the pressure was released by a back pressure control valve, the acid was pumped into a rubber lined storage vat. Stability results are summarized in Table I below:

| Example No. | Treatment | Percent Solids by Weight on Standing, After— | | | |
|---|---|---|---|---|---|
| | | 1 day | 12 days | 30 days | 60 days |
| 1 | 150° C | 0.26 | 0.57 | No change | No change. |
| 2 | Not treated | 0.57 | 3.31 | 8.15 | 10.22. |
| 3 | 165° C | 0.37 | 0.36 | No change | No change. |
| 4 | 185° C | 0.40 | 0.47 | do | Do. |
| 5 | 150° C | 0.89 | 0.94 | do | Do. |
| 6 | Not treated | 4.20 | 4.15 | 5.60 | 9.73. |

*Example II*

A sample of the untreated crude wet process acid used in Example I was used except that the raw acid was stored after centrifugation, and was not treated according to the instant invention. Stability results are summarized in Table I, below. It will be seen that copious amounts of precipitants were observed in Example I, while the acid treated in Example I remained free from excess precipitation.

*Example III*

The procedure of Example I was followed except that the heating temperature was 185° C. Stability is summarized in Table I.

Example IV

The procedure of Example I was followed, except that the heatin gtemperature was 185° C. Stability is summarized in Table I.

Example V

Commerical wet process phosphoric acid of commerce which had been decanted to remove gross precipitants after quiescent storage for 6 days, but had not been centrifuged, was treated according to the inventive process at 150° C. for about 8 minutes, and then stored and observed as in Example I. Results are summarized in Table I.

Example VI

A sample of the crude wet process used in Example V was stored after decantation but without heat treatment of the instant invention. Stability results are summarized in Table I.

Note also the substantial increase in solids on those Examples II and VI, which were not treated according to this inventive process. In Example II, the increase from 0.57 to 3.31% solids from the 1st to the 12th day is a "normal" phenomenon. Example VI is a so-called "abnormal" phenomenon, in that precipitation does not follow a predictable pattern. Unfortunately, the "abnormal" is as frequently observed as the "normal" which completely negates any predictability in handling today's untreated acids of commerce.

It was further found, and it can be seen from the data, that there is no substantial increase in precipitate found in our treated acid, after the first day. This is a useful feature in that it is customary to provide minimal storage for shipping purposes and chemical analytical reasons. The precipitate after 1 day in our treated acid is not enough to change the analytical results to a substantial degree, but does provide for clean-up of the small amount of solids which do form, prior to shipping.

Although quantitative measurements were not taken, the samples of treated and untreated acid were kept over a period of 4 months. During this time, it was observed that containers of untreated acid were as much as one-half or more full of deposited impurities, while the containers of our treated acid had but a slight film of precipitation deposited. Example III, in particular, exhibited no visible precipitation, while Example IV had a faint "dusting" on the bottom of the container.

What we claim is:

1. A process for treating crude wet process phosphoric acid of commerce by heating said acid to a temperature from above its boiling point to about 250° C. while under pressure to prevent evaporation and resulting concentration of said acid, cooling said acid, thereby stabilizing dissolved solids against subsequent precipitation.

2. A process for treating crude wet process phosphoric acid of commerce by heating to 100–250° C. for at least 2 minutes under pressure to prevent evaporation and concentration of said acid and subsequently cooling said acid.

3. A process for treating crude wet process phosphoric acid of commerce by heating to a temperature from above said acid boiling point to about 250° C. under pressure for a period not less than 2 minutes and thereafter cooling and releasing pressure on said acid.

4. A process for treating crude wet process phosphoric acid of commerce by heating to a temperature of about 100–250° C., under autogeneous pressures for a period of 2–60 minutes, thereafter cooling said acid to about 70° C. and releasing pressure on said acid to atmospheric, so that no evaporation of solution occurs; whereby said acid exhibits small and inconsequential amounts of post-precipitation, enabling said acid to be shipped or stored without the formation of annoying sludge deposits.

5. The process according to claim 4 in which the preferred temperature range is 120–160° C.

References Cited

UNITED STATES PATENTS

| | | | |
|---|---|---|---|
| 1,597,984 | 8/1926 | La Bour | 23—165 |
| 2,936,888 | 5/1960 | Williams | 23—165 X |
| 3,119,662 | 1/1964 | Viventi et al. | 23—165 |

OTHER REFERENCES

Goodwin: Autoclaves and High Pressure Work, D. Van Nostrand, New York, 1925, p. 15.

MILTON WEISSMAN, *Primary Examiner.*

OSCAR R. VERTIZ, *Examiner.*

O. F. CRUTCHFIELD, A. J. GREIF,
*Assistant Examiners.*